United States Patent
Jeong et al.

(10) Patent No.: US 8,808,447 B2
(45) Date of Patent: Aug. 19, 2014

(54) PIGMENT PAINT FOR AN EXTERIOR MATERIAL HAVING GOOD WEATHER RESISTANCE AND METHOD FOR MANUFACTURING SAME

(75) Inventors: Jae-Il Jeong, Cheongju-si (KR); Nam-Il Lee, Cheongju-si (KR); Sang-Keun Park, Cheongju-si (KR); Jin-Hyung Lee, Cheongju-si (KR); Kwang-Choong Kang, Cheongju-si (KR); Byung-Ki Choi, Chungcheongbuk-do (KR); Kwang-Soo Lim, Cheongju-si (KR); Kil-Wan Chang, Cheongju-si (KR)

(73) Assignee: CQV Co., Ltd., Chungcheongbuk-Do (KR)

( * ) Notice: Subject to any disclaimer, the term of this patent is extended or adjusted under 35 U.S.C. 154(b) by 0 days.

(21) Appl. No.: 14/113,324

(22) PCT Filed: Mar. 8, 2012

(86) PCT No.: PCT/KR2012/001694
§ 371 (c)(1),
(2), (4) Date: Oct. 22, 2013

(87) PCT Pub. No.: WO2012/161412
PCT Pub. Date: Nov. 29, 2012

(65) Prior Publication Data
US 2014/0041551 A1 Feb. 13, 2014

(30) Foreign Application Priority Data
May 24, 2011 (KR) ........................ 10-2011-0048979

(51) Int. Cl.
C09C 3/06 (2006.01)
C09C 1/00 (2006.01)
C09C 1/02 (2006.01)
C09C 1/28 (2006.01)
C01G 7/00 (2006.01)
C09C 1/30 (2006.01)
C08K 3/00 (2006.01)
C09C 1/36 (2006.01)

(52) U.S. Cl.
CPC ........... *C08K 3/0075* (2013.01); *C01P 2006/60* (2013.01); *C01G 7/003* (2013.01); *C09C 3/06* (2013.01); *C01P 2004/04* (2013.01); *C01P 2004/64* (2013.01); *C09C 1/30* (2013.01); *C01G 7/00* (2013.01); *C09C 1/36* (2013.01)
USPC ........... 106/467; 106/415; 106/417; 106/418; 106/438; 106/439; 106/440; 106/442; 106/444; 106/446; 106/450; 106/453; 106/454; 106/456; 106/457; 106/466; 106/480; 106/483; 106/484; 427/218; 427/219

(58) Field of Classification Search
USPC ......... 106/415, 417, 418, 438, 439, 440, 442, 106/444, 446, 450, 453, 454, 456, 457, 466, 106/467, 480, 486, 484; 427/218, 219
See application file for complete search history.

(56) References Cited

U.S. PATENT DOCUMENTS

| | | | | |
|---|---|---|---|---|
| 5,478,550 A * | 12/1995 | Suzuki et al. | .................. | 424/59 |
| 6,599,355 B1 * | 7/2003 | Schmidt et al. | ............... | 106/417 |
| 6,689,205 B1 * | 2/2004 | Bruckner et al. | ............. | 106/415 |
| 6,692,561 B1 * | 2/2004 | Schoen et al. | ................ | 106/439 |
| 6,719,837 B2 * | 4/2004 | Bertaux et al. | ................ | 106/415 |
| 7,300,695 B2 * | 11/2007 | Argoitia et al. | ............... | 428/206 |
| 7,413,599 B2 * | 8/2008 | Henglein et al. | ............. | 106/415 |
| 7,699,927 B2 * | 4/2010 | Henglein et al. | ............. | 106/481 |
| 7,914,893 B2 * | 3/2011 | Handrosch et al. | ........... | 428/403 |
| 8,197,591 B2 * | 6/2012 | Kaupp et al. | .................. | 106/439 |
| 8,500,901 B2 * | 8/2013 | Rueger et al. | ................. | 106/415 |
| 8,647,429 B2 * | 2/2014 | Melson et al. | ................ | 106/415 |
| 2009/0056591 A1* | 3/2009 | Schmidt et al. | ............... | 106/415 |
| 2009/0311209 A1* | 12/2009 | Bujard | ............................ | 424/63 |
| 2011/0259243 A1* | 10/2011 | Schumacher et al. | ........ | 106/417 |
| 2011/0265689 A1* | 11/2011 | Schumacher et al. | ........ | 106/417 |

FOREIGN PATENT DOCUMENTS

| | | |
|---|---|---|
| JP | 06-145026 | 5/1994 |
| JP | 3114171 B2 | 12/2000 |
| JP | 2002080747 | 3/2002 |
| JP | 2002526591 A | 8/2002 |
| KR | 1020080015223 A | 2/2008 |
| WO | 2011020571 A1 | 2/2011 |

OTHER PUBLICATIONS

International Search Report for PCT/KR2012/001694 mailed Sep. 20, 2012.
Chinese Office Action dated Jun. 17, 2014.

* cited by examiner

*Primary Examiner* — Anthony J Green
(74) *Attorney, Agent, or Firm* — Lowe Hauptman & Ham, LLP

(57) ABSTRACT

The present invention relates to a pigment paint for an exterior material and to a method for manufacturing the same. The pigment paint comprises: a flake matrix, a first metal oxide layer coated on the upper portion of the transparent matrix, an oxide layer containing MgO—SiO$_2$ coated on the upper portion of the first metal oxide layer, and a second metal oxide layer coated on the upper portion of the oxide layer. In order to ensure humidity resistance and weather resistance required for a lustrous pigment paint for exterior materials, a cerium layer and an aluminum oxide layer are further coated. Properties such as high luminance, high chromaticity, and high gloss, which could not be achieved using conventional techniques, can be achieved and a pigment paint having a multi-colored pearl luster can be provided.

7 Claims, No Drawings

PIGMENT PAINT FOR AN EXTERIOR MATERIAL HAVING GOOD WEATHER RESISTANCE AND METHOD FOR MANUFACTURING SAME

TECHNICAL FIELD

The present invention relates to a pigment coated onto an exterior material as a single layer or multiple layers and, more particularly, to a pigment in which a low refractive index layer is formed of $Mgo.SiO_2$ among multiple layers formed by cross-coating to exhibit high brightness, high gloss and high chroma while realizing multiple colors.

BACKGROUND ART

Generally, pigments coated onto an exterior material include low and high refractive index layers formed on a transparent matrix.

Typically, the low refractive index layer consists of $SiO_2$.

Here, when the low refractive index layer is excessively thin, the pigment exhibits low brightness and low gloss. Thus, to improve brightness and gloss, a low refractive index $SiO_2$ layer must have a large thickness. However, increase in thickness of the low refractive index layer causes a high likelihood of cracking, and results in realization of only a single color.

DISCLOSURE

Technical Problem

An aspect of the present invention is to provide a pigment which is coated onto an exterior material as a single layer or multiple layers and can form a low refractive index layer including $MgO.SiO_2$ on a matrix surface to exhibit high brightness, high gloss and high chroma while improving moisture resistance and weather resistance using aluminum and cerium-treated layers.

Another aspect of the present invention is to provide a pigment which has an increased amount of $MgO.SiO_2$ to exhibit multiple colors without increasing the thickness of a lower refractive index layer while preventing failure such as cracking and the like.

Technical Solution

In accordance with one embodiment of the present invention, a method for preparing a pigment for exterior materials includes: (a) forming a pigment powder by coating an oxide layer including $MgO.SiO_2$ onto surfaces of flakes used as matrices; (b) forming a suspension having a solid content of 5% by weight (wt %) to 20 wt % by mixing the pigment powder with DI water, followed by stirring and dispersing the mixture; (c) dumping $CeCl_3$ to the suspension, followed by stirring for 5 minutes to 30 minutes; (d) heating the suspension of (c) to 60° C. to 90° C., followed by stirring for 10 minutes to 60 minutes; (e) refluxing the suspension of (d) for 5 minutes to 30 minutes after adjusting the pH thereof to 1 to 5; (f) mixing the suspension of (e) with an $Al(NO_3)_3$ solution to maintain a constant pH and refluxing the suspension for 10 minutes to 60 minutes after injection of the solution; (g) adjusting the pH of the suspension of (f) to 3 to 9 while stirring the suspension; and (h) injecting a silane coupling solution into the suspension having an increased pH in (g) to maintain a pH and refluxing the suspension for 10 minutes to 30 minutes after injection of the silane coupling solution.

The (a) forming pigment powder may include: (a1) forming a suspension by mixing the flake with DI water, followed by stirring and dispersing the mixture; (a2) coating a first metal oxide layer onto the surfaces of the flakes by hydrolyzing a first soluble inorganic metal salt solution after titrating the first soluble inorganic metal solution into the suspension of (a1); (a3) coating an oxide layer onto a surface of the first metal oxide layer by hydrolyzing a soluble-inorganic salt solution containing 5 wt % to 35 wt % of $MgO.SiO_2$ after titrating the soluble-inorganic salt solution into the suspension of (a2); (a4) coating a second metal oxide layer onto a surface of the oxide layer by hydrolyzing a second soluble inorganic metal salt solution after titrating the second soluble inorganic metal salt solution into the suspension of (a3); and (a5) separating pigment powder from the suspension of (a4).

In addition, according to embodiments of the present invention, a pigment for exterior materials includes: a flake matrix including at least one of synthetic mica, natural mica, glass, plate-shaped iron oxide, plate-shaped alumina, and plate-shaped silica; a first metal oxide layer coated onto an upper side of the matrix; an oxide layer which is coated onto an upper side of the first metal oxide layer and includes $MgO.SiO_2$; a second metal oxide layer coated onto an upper side of the oxide layer; a cerium layer formed on the second metal oxide layer; and an aluminum oxide layer formed on an upper side of the cerium layer.

Advantageous Effects

According to the invention, the method for preparing a pigment for exterior materials may form a low refractive index layer using $MgO.SiO_2$, thereby enabling realization of high brightness and high gloss even when applied as a thin coating.

In addition, since there is no need for increase in thickness of the low refractive index layer, a multicolor pigment exhibiting high chroma can be easily prepared.

Further, according to the invention, $MgO.SiO_2$ used in the pigment for exterior materials allows an aluminum oxide layer and a cerium-treated layer, which are necessary for a gloss pigment for exterior materials, to be easily deposited onto a matrix, thereby securing improved moisture resistance and weather resistance.

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be limited only by the accompanying claims and equivalents thereof. Like components will be denoted by like reference numerals throughout the specification.

Hereinafter, a pigment for exterior materials and a method for preparing the same according to the invention will be described in detail.

According to one embodiment of the invention, a method for preparing a pigment for exterior materials includes: forming a suspension; forming a first metal oxide layer; forming a $MgO.SiO_2$ layer; a second metal oxide layer; forming a cerium layer; and forming an aluminum oxide layer.

Formation of Suspension

First, in operation of forming a suspension, DI water is mixed with flakes, which have a constant size and are used as matrices, followed by stirring and dispersing, thereby forming a suspension.

Here, the flakes may have a plate shape and a particle size from 5 μm to 250 μm. If the flakes have a particle size of less than 5 μm, the plate-shaped matrix changes into a spherical matrix as the coating thickness increases when a material is coated on the surface of the matrix. That is, an aspect ratio is reduced, thereby causing scattering of light by diffuse reflection, and making it difficult for the pigment to have the same color with the same index of refraction.

Conversely, if the flakes have a particle size of greater than 250 μm, formation of a coating layer for realization of color is difficult due to increase in surface area to be coated.

The matrix may be at least one selected from among synthetic mica, natural mica, glass, plate-shaped iron oxide, plate-shaped alumina, and plate-shaped silica.

In addition, the suspension may include 5 wt % to 20 wt % of the matrix in terms of solid content.

If the solid content of the matrix is less than 5 wt %, a subsequent oxide layer cannot be formed, or can be insufficiently formed. In addition, if the solid content of the matrix exceeds 20 wt %, reaction efficiency can be reduced.

As described above, when the suspension for preparation of the pigment is formed, the suspension is heated to 60° C. to 90° C. If the suspension has a temperature of less than 60° C., a non-uniform coating can be formed and a coating material may have extremely irregular size and shape. In addition, if the suspension has a temperature of greater than 90° C., coating reaction violently occurs, creating a coating layer with a rough surface.

Here, since the pigment does not have high chroma when the coating layer has an unstable state, the temperature range is advantageously maintained within this range.

In addition, the conditions of the solid content and temperature range of the suspension may be applied to all reactions for forming first and second metal oxide layers, an oxide layer, a cerium layer, and an aluminum oxide layer described below.

Formation of First Metal Oxide Layer

Next, after preparing and heating the suspension, a first metal oxide layer is formed on the surface of the flake by hydrolyzing a first soluble inorganic metal salt solution after titrating the first soluble inorganic metal solution into the suspension.

Here, the inorganic metal salt includes at least one selected from among $SnCl_4$, $TiCl_4$, $TiOCl_2$, $TiOSO_4$, $FeCl_3$, $FeSO_4$, $SiCl_4$, $ZrOCl_2$, $Na_2O.SiO_2.5H_2O$, $MnCl_2$, $MgCl_2$, $AlCl_3$, and $CoCl_2$.

In addition, the first soluble inorganic metal salt solution contains the inorganic metal salt dissolved therein and is added dropwise to the suspension to induce hydrolysis.

In this stage, the suspension has a pH of 1 to 9. If the suspension has a pH of less than 1, the first metal oxide layer is not normally coated, and if the suspension has a pH of greater than 9, the coating material can be non-uniformly coated and have extremely irregular size and shape. As a result, the coating layer can have a rough surface, preventing the pigment from exhibiting high chroma.

Further, after injection of the solution while the pH of the suspension is maintained, the suspension is refluxed for 10 minutes to 30 minutes.

Here, the pH of the suspension is maintained such that the first metal oxide layer formed on the surface of the matrix has a coating rate from 1% to 50%, and the refluxing process is performed such that impact due to pH can be reduced and the coating material can be sufficiently coated on the surface of the matrix.

Thus, if refluxing time is less than 10 minutes, a sufficient coating rate cannot be obtained, and cracking can occur due to impact applied to the matrix. In addition, if refluxing time exceeds 30 minutes, breakage of the matrix can occur due to stirring or separation of the coating layer.

Formation of $MgO.SiO_2$ Layer

The suspension, which contains a solid material formed by coating the first metal oxide layer onto the surface of the matrix according to the above process, is reheated to 60° C. to 90° C. Here, this temperature range is set to form an optimal coating layer, as described above.

Next, after a soluble-inorganic salt solution containing $MgO.SiO_2$ is titrated into the heated suspension, $MgO.SiO_2$ is coated onto a surface of the first metal oxide layer by hydrolyzing the soluble-inorganic salt solution. Herein, a layer formed by coating $MgO.SiO_2$ alone or by coating $MgO.SiO_2$ together with another oxide will be referred to as an oxide layer.

The soluble-inorganic salt solution includes at least one selected from among water glass, $MgCl_2$, silicate, $AlCl_3$, $KCl_3$, and boric acid.

In addition, the suspension has a pH of 4 to 14. If the suspension has a pH of less than 4, it is difficult to achieve normal coating of the oxide layer, and if the suspension has a pH of greater than 14, the coating material has extremely irregular size and shape, and thus, the pigment does not have high chroma.

Further, after injection of the solution while the pH of the suspension is maintained, the suspension is refluxed for 30 minutes to 60 minutes.

Here, the pH of the suspension may be adjusted such that the oxide layer formed on the surface of the matrix has a coating rate from 1% to 30% for the pigment to exhibit high chroma and high gloss properties, and a coating rate from 30% to 90% for a multi-color pigment.

For the multi-color pigment, the oxide layer may have a coating rate up to 3 times that of the oxide layer for the gloss pigment, and thus, the oxide layer may have a different total weight ratio between the pigment having high chroma and high gloss properties and the multi-color pigment.

If the oxide layer is present in a weight ratio of 5 wt % to 10 wt % based on the total weight of the completed pigment, the pigment exhibiting high chroma and high gloss exhibits optimal performance. That is, if the amount of the oxide layer is less than 5 wt %, the pigment has deteriorated gloss properties, and if the amount of the oxide layer is greater than 10 wt %, the pigment has deteriorated chroma.

In addition, when the oxide layer is present in a weight ratio of 5 wt % to 35 wt % based on the total weight of the completed pigment, the multi-color pigment exhibits optimal performance. That is, if the amount of the oxide layer is less than 5 wt %, the pigment exhibits a single color, and if the amount of the oxide layer is greater than 35 wt %, the pigment has deteriorated color conversion properties.

Thus, according to the invention, although it is desirable that the oxide layer be present in a weight ratio of 5 wt % to 35 wt %, the content of the oxide layer is not limited thereto, and may vary depending upon matrix type, coating material and coating thickness.

Herein, the weight ratio means a weight ratio based on the total weight of the pigment including both the cerium layer and the aluminum oxide layer described below. However, since the sum of weight ratios of the cerium layer and the aluminum oxide layer has an insignificant overall effect on the pigment, the weight ratio of the oxide layer to the pigment excluding the cerium layer and the aluminum oxide layer may also be used.

According to the invention, the oxide layer includes $MgO.SiO_2$ as a major component, and may further include at least one selected from among $SiO_2$, $MgO.Al_2O_3$, $K_2O.SiO_2$, and $Mg_2SiO_4$.

The oxide layer functions as a low refractive index layer in the pigment, and can solve problems, such as cracking and the like, which can occur in the case wherein only a $SiO_2$ layer is formed.

In addition, when the $MgO.SiO_2$ oxide layer is used, the thickness of the low refractive index layer can be easily adjusted, and the pigment can easily exhibit high gloss, high chroma and multi-color properties.

As described above, according to the invention, the pigment for exterior materials essentially consists of: the thin transparent flake matrix; the first metal oxide layer coated onto the transparent matrix; and the oxide layer, which is coated onto the first metal oxide layer and includes $MgO.SiO_2$ as basic components.

Formation of Second Metal Oxide Layer

According to the invention, for protection of the oxide layer and improvement of properties such as gloss and the like, a second metal oxide layer is coated onto the oxide layer, and the coating process is the same as the process of coating the first metal oxide layer.

Next, the suspension prepared after completion of coating the second metal oxide layer is filtered and subjected to washing with deionized water (DI water) and drying, followed by baking of residues and screening, thereby preparing the pigment for exterior materials according to the invention.

As described above, after preparation of the pigment powder exhibiting high brightness, high gloss and high chroma by forming the oxide layer including $MgO.SiO_2$, additional coating is performed to impart moisture resistance, weather resistance and the like to the pigment for exterior materials.

Formation of Cerium Layer

First, after mixing DI water with the pigment powder coated with the oxide layer including $MgO.SiO_2$, the mixture is stirred and dispersed, thereby forming a suspension having a solid content of 5 wt % to 20 wt %.

Here, the solid content and the temperature of the suspension are the same as those in 'Formation of suspension'.

Next, after $CeCl_3$ is added to the suspension, the suspension is stirred for 5 minutes to 30 minutes and heated to 60° C. to 90° C.

Here, advantageously, the suspension is sufficiently stirred for 10 minutes to 60 minutes. Since the pigment is coated with the first metal oxide layer, the oxide layer including $MgO.SiO_2$ and the second metal oxide layer, the suspension can be insufficiently stirred if stirring time is less than 10 minutes. Conversely, if the stirring time exceeds 60 minutes, there can be a problem of damage to the coating layer.

After completion of the stirring process, the suspension is adjusted to a pH of 1 to 5 and refluxed for 5 minutes to 30 minutes, thereby forming a cerium layer on the second metal oxide layer finally coated onto the pigment powder.

Here, if the suspension has a pH of less than 1 or is refluxed for less than 5 minutes, normal coating of the cerium layer cannot be achieved, and if the suspension has a pH of greater than 5 or is refluxed for greater than 30 minutes, the coating material can have extremely irregular size and shape, thereby causing synthesis of a pigment having high chroma difficult.

Formation of Aluminum Oxide Layer

As described above, after the suspension including the gloss pigment coated with the cerium layer is formed, an $Al(NO_3)_3$ solution is mixed with the suspension to maintain the pH of the suspension, with the solid content and the temperature of the suspension maintained at 5 wt % to 20 wt % and at 60° C. to 90° C.

Here, if the suspension has a solid content of less than 5 wt %, or has a temperature of less than 60° C., reaction for formation of the aluminum oxide layer may not occur or may insufficiently occur. In addition, if the suspension has a solid content of greater than 20 wt %, or has a temperature of greater than 90° C., reaction efficiency for formation of the aluminum oxide layer can be decreased.

Next, the suspension is refluxed for 10 minutes to 60 minutes after injection of the solution to maintain the pH of the suspension, and is stirred to have a pH of 3 to 9, thereby forming an aluminum oxide layer on the cerium layer.

Here, if the suspension has a pH of less than 1 or is refluxed for less than 5 minutes, the cerium layer can be undesirably coated, and if the suspension has a pH of greater than 5 or is refluxed for greater than 30 minutes, the coating material can have extremely irregular size and shape, thereby making it difficult to obtain a pigment having high chroma.

Next, in order to maintain a coating state of the cerium layer and the aluminum oxide layer, a silane coupling layer may be optionally formed. To this end, a silane coupling solution is injected into the suspension, in which the aluminum oxide layer is coated onto the cerium layer, and which has a constant pH, followed by refluxing the suspension for 10 minutes to 30 minutes, thereby forming the silane coupling layer covering the cerium layer and the aluminum oxide layer.

Here, if the suspension has a pH of less than 1 or is refluxed for less than 10 minutes, the silane coupling layer can be undesirably coated, and if the suspension has a pH of greater than 5 or is refluxed for greater than 30 minutes, the silane coupling layer can have extremely irregular size and shape, thereby making it difficult to obtain a pigment having improved physical properties.

As described above, according to the invention, when the pigment for exterior materials includes all of the layers formed on upper and lower sides of the matrix, the pigment has a multilayer coating structure of 11 layers. In this case, the pigment for exterior materials includes low and high refractive index layers on the surface of the transparent matrix, and exhibits high gloss, high chroma and excellent multi-color properties.

Since such properties mainly depend on the presence of the $MgO.SiO_2$ oxide layer, high gloss, high chroma and multi-color properties depending on the presence of the oxide layer will be described hereinafter.

In addition, the pigment for exterior materials can secure excellent properties in terms of moisture resistance, weather resistance and the like, due to the cerium layer and the aluminum oxide layer, and exhibit the following properties.

Chroma (Colorimeter Value)

Comparative Examples 1 to 28 correspond to samples of the case wherein a $SiO_2$ oxide layer is formed on a surface of a mica flake matrix, and Examples 1 to 32 correspond to samples of the case wherein an $MgO.SiO_2$ oxide layer is formed thereon.

Both first and second metal oxide layers were applied to Examples and Comparative Examples, and there was no change in properties due to these layers.

In addition, testing was performed without formation of a cerium layer and an aluminum oxide layer in the preparation of a pigment for exterior materials.

1) High Chroma and High Gloss Pigment

TABLE 1

|  | a* | b* |  | a* | b* |
|---|---|---|---|---|---|
| Comparative Example 1 | 2.64 | 38.51 | Example 1 | 4.14 | 42.87 |
| Comparative Example 2 | 31.58 | −8.81 | Example 2 | 37.10 | −13.11 |
| Comparative Example 3 | 29.90 | −39.95 | Example 3 | 33.16 | −44.68 |
| Comparative Example 4 | −9.56 | −40.16 | Example 4 | −12.87 | −44.37 |
| Comparative Example 5 | −19.43 | 13.14 | Example 5 | −23.30 | 15.46 |
| Comparative Example 6 | 7.83 | 48.01 | Example 6 | 9.33 | 59.24 |

2) Multi-Color Pigment

TABLE 2

|  | 25° | | 45° | | 75° | |
|---|---|---|---|---|---|---|
|  | a* | b* | a* | b* | a* | b* |
| Comparative Example 7 | −0.25 | 35.36 | −1.83 | 12.97 | −2.37 | 1.25 |
| Comparative Example 8 | 26.69 | 11.01 | 11.53 | 6.95 | 2.16 | 4.35 |
| Comparative Example 9 | 7.18 | −34.65 | 7.25 | −19.69 | 3.13 | −9.12 |
| Comparative Example 10 | −21.49 | −13.36 | −7.24 | −11.56 | 0.54 | −10.43 |
| Comparative Example 11 | −25.57 | −3.59 | −9.52 | −8.11 | −1.12 | −9.21 |
| Example 7 | −0.78 | 41.62 | −3.49 | 15.59 | −4.42 | 2.65 |
| Example 8 | 29.24 | 13.05 | 13.03 | 8.75 | 3.36 | 5.87 |
| Example 9 | 8.55 | −38.7 | 8.32 | −22.88 | 4.68 | −11.52 |
| Example 10 | −25.15 | −16.19 | −8.32 | −14.78 | 1.35 | −13.40 |
| Example 11 | −29.05 | −5.89 | −12.41 | −9.35 | −2.58 | −11.64 |

Referring to Tables 1 and 2, from comparison of results between Examples and Comparative Examples, it can be seen that colorimeter values (a*, b*) were increased after use of the $MgO.SiO_2$ oxide layer.

Here, since a higher colorimeter value indicates better chroma, the pigment according to the invention patently exhibits improved chroma.

Gloss Value

1) High Chroma and High Gloss Pigment

TABLE 3

|  | 20° | 60° | 85° |
|---|---|---|---|
| Before use | | | |
| Comparative Example 12 | 95.3 | 96.2 | 93.5 |
| Comparative Example 13 | 93.9 | 96.5 | 93.9 |
| Comparative Example 14 | 96.4 | 94.2 | 93.7 |
| Comparative Example 15 | 98.1 | 94.6 | 95.1 |
| Comparative Example 16 | 93.8 | 94.6 | 91.9 |
| Comparative Example 17 | 100.2 | 97.5 | 93.8 |
| After use | | | |
| Example 12 | 100.3 | 101.9 | 97.3 |
| Example 13 | 98.2 | 99.0 | 97.7 |
| Example 14 | 101.1 | 98.1 | 98.1 |
| Example 15 | 102.4 | 98.0 | 97.3 |
| Example 16 | 97.2 | 98.7 | 95.4 |
| Example 17 | 105.2 | 103.9 | 97.9 |

2) Multi-Color Pigment

TABLE 4

|  | 20° | 60° | 85° |
|---|---|---|---|
| Before use | | | |
| Comparative Example 18 | 100.1 | 94.8 | 97.5 |
| Comparative Example 19 | 95.5 | 92.9 | 98.1 |
| Comparative Example 20 | 94.7 | 91.9 | 94.5 |
| Comparative Example 21 | 98.3 | 94.1 | 99.2 |
| Comparative Example 22 | 93.5 | 92.8 | 98.6 |
| After use | | | |
| Example 18 | 104.5 | 97.3 | 101.8 |
| Example 19 | 100.9 | 97.0 | 102.5 |
| Example 20 | 99.8 | 97.1 | 100.9 |
| Example 21 | 102.1 | 97.2 | 104.8 |
| Example 22 | 100.7 | 97.1 | 104.8 |

Referring to Tables 3 and 4, Comparative Examples 12 to 22 correspond to the case wherein the $SiO_2$ oxide layer is formed, and Examples 12 to 22 correspond to the case wherein the $MgO.SiO_2$ oxide layer is formed.

Thus, from comparison of results between Examples and Comparative Examples, increase in gloss value after use of the $MgO.SiO_2$ oxide layer is readily apparent.

Change of Chroma and Gloss Value Depending on a Content Ratio of $MgO.SiO_2$ Oxide Layer 1) High Chroma and High Gloss Pigment

TABLE 5

| Chroma | Content ratio (wt %) | a* | b* |
|---|---|---|---|
| Comparative Example 23 | 3 | 0.90 | −1.25 |
| Comparative Example 24 | 4 | −0.49 | 1.34 |
| Example 23 | 5 | 4.14 | 42.87 |
| Example 24 | 10 | 9.33 | 59.24 |
| Example 25 | 20 | 23.30 | −15.46 |
| Example 26 | 30 | 33.16 | −44.68 |
| Example 27 | 35 | 37.10 | −13.11 |
| Comparative Example 25 | 36 | −1.28 | 0.91 |

TABLE 6

| Gloss value | Content ratio (wt %) | 20° | 60° | 85° |
|---|---|---|---|---|
| Comparative Example 26 | 3 | 83.9 | 86.5 | 81.9 |
| Comparative Example 27 | 4 | 85.3 | 90.2 | 85.5 |
| Example 28 | 5 | 98.2 | 99.0 | 97.7 |
| Example 29 | 10 | 100.3 | 101.9 | 97.3 |
| Example 30 | 20 | 101.2 | 98.1 | 98.1 |
| Example 31 | 30 | 102.4 | 98.0 | 97.3 |
| Example 32 | 35 | 105.2 | 103.9 | 97.9 |
| Comparative Example 28 | 36 | 80.9 | 81.5 | 73.9 |

2) Multi-Color Pigment

TABLE 7

| Chroma | Content ratio (wt %) | 25° a* | 25° b* | 45° a* | 45° b* | 75° a* | 75° b* |
|---|---|---|---|---|---|---|---|
| Comparative Example 23 | 3 | −0.25 | 2.37 | −0.13 | 0.57 | −0.31 | 0.27 |
| Comparative Example 24 | 4 | −0.49 | 1.34 | −0.49 | 1.34 | −0.49 | 1.34 |
| Example 23 | 5 | −0.78 | 41.62 | −3.49 | 15.59 | −4.42 | 2.65 |
| Example 24 | 10 | −25.15 | −16.19 | −8.32 | −14.78 | 1.35 | −13.40 |
| Example 25 | 20 | −29.05 | −5.89 | −12.41 | −9.35 | −2.58 | −11.64 |
| Example 26 | 30 | 8.55 | −38.7 | 8.32 | −22.88 | 4.68 | −11.52 |
| Example 27 | 35 | 29.24 | 13.05 | 13.03 | 8.75 | 3.36 | 5.87 |
| Comparative Example 25 | 36 | 2.57 | 1.38 | 0.27 | 2.39 | 1.84 | 0.25 |

TABLE 8

| Gloss value | Content ratio (wt %) | 20° | 60° | 85° |
|---|---|---|---|---|
| Comparative Example 26 | 3 | 70.8 | 80.7 | 77.4 |
| Comparative Example 27 | 4 | 85.3 | 90.2 | 85.5 |
| Example 28 | 5 | 99.8 | 97.1 | 100.9 |
| Example 29 | 10 | 100.9 | 97.0 | 102.5 |
| Example 30 | 20 | 102.1 | 97.2 | 104.8 |
| Example 31 | 30 | 100.7 | 97.1 | 104.8 |
| Example 32 | 35 | 104.5 | 97.3 | 101.8 |
| Comparative Example 28 | 36 | 85.1 | 83.9 | 89.5 |

Referring to Tables 5 to 8, it can be seen that in the case of Comparative Examples 23, 24, 26 and 27 in which the MgO·SiO$_2$ oxide layer was coated in an amount of less than 5 wt %, the coating layer had a small thickness, thereby providing an incorrect ratio between layers.

These results are believed to be due to insufficient covering of a lower layer by the coating layer due to small thickness of the coating and thus provided a rough surface causing diffuse reflection. As such, the pigment did not obtain high chroma and high gloss. In addition, the pigments of Comparative Examples 23, 24, 26 and 27 could not obtain multi-color properties for the same reasons.

When the MgO·SiO$_2$ oxide layer was coated in an amount of greater than 30 wt %, the coating layer had a large thickness and the ratio between layers was incorrect, thereby achieving an undesirable index of refraction. As a result, the resulting pigment had undesired color and low chroma.

On the other hand, the pigments, prepared in Examples 23 to 32 in which the MgO·SiO$_2$ oxide layers were formed within the content range according to the present invention, had normal chroma and gloss values, as shown in Tables 1 to 4.

As described above, by the method for preparing a pigment for exterior materials according to the invention, a pigment exhibiting high brightness and high gloss can be realized using MgO·SiO$_2$ as a low refractive index layer despite small thickness.

In addition, since there is no need for increase in thickness of the low refractive index layer, the pigment can easily secure high chroma and high gloss, and a pearlescent pigment for exterior materials having multiple colors can be easily prepared.

Moisture Resistance and Weather Resistance

The pigment for exterior materials according to the invention was evaluated as to moisture resistance and weather resistance by the following humidity exposure testing and analysis of measurement results of distinctiveness.

First, a cerium layer and an aluminum oxide layer were coated onto the pigments prepared in Comparative Examples 26 to 28 and Examples 29 to 32 as listed in Table 8. For comparison, the cerium layer and the aluminum oxide layer were not formed on the pigment prepared in Example 28.

Next, each of the pigments of Comparative Examples 26 to 28 and Examples 29 to 32 was mixed with a water-based paint composition. Here, subsequent testing was carried out at a pigment to paint ratio of 13:100.

Next, the water-based paints including the pigments of Comparative Examples 26 to 28 and Examples 29 to 32 were coated to a thickness of 15 μm to 20 μm on primed steel panels (APR 25379, Advanced Coating Technologies, Detroit, Mich., US) each having a size of 7.5 cm×15 cm, and the primer was flashed for at least 10 minutes, baked at 85° C. for 6.5 minutes, and then cooled.

Next, a clean (un-pigmented) upper paint layer was coated to a thickness of 40 μm to 45 μm, and exposed portions of the resulting panels were masked for comparison with unexposed portions thereof.

Next, the sample panels prepared in the above manner were exposed to a 100% humidity atmosphere at 40° C. for 240 hours, and the resulting panels were evaluated in accordance with ASTM D3359, Vol. 6 Adhesion Test Method.

Results are shown in Table 9, and are rated from Grades 0B to 5B. Here, 0B means total cohesive failure (65% or more), and 5B means no cohesive failure.

As a result, Grades 0B to 1B were provided to the pigments of Comparative Examples and Example 28, and Grade 5B was provided to the pigments coated with the cerium layer and the aluminum oxide layer in Examples 29 to 32.

Next, weather resistance was evaluated by measuring distinctiveness of images (DOI) according to Dorigon II Distinctiveness of Reflected Image Goniophotometer (Hunter Lab.). DOI after humidity conditioning before exposure was divided by DOI before humidity conditioning in an exposed state, and the resultant value was multiplied by 100, thereby calculating a distinctiveness of image value (% DOI). The pigments having a high % DOI exhibited superior stability compared to those having a low % DOI.

As a result, the pigments of Comparative Examples and Example 28 had a % DOI of 50% or less, and the pigments coated with the cerium layer and the aluminum oxide layer in Examples 29 to 32 had a % DOI of 90% or more.

TABLE 9

| | Coated with cerium layer and aluminum oxide layer | Humidity resistance ASTM D3359, Vol. 6 | Weather Resistance (% DOI) |
|---|---|---|---|
| Comparative Example 26 | X | 0B | 39 |
| Comparative Example 27 | X | 0.5B | 40 |
| Example 28 | X | 1B | 45 |
| Example 29 | ○ | 5B | 95 |
| Example 30 | ○ | 5B | 98 |
| Example 31 | ○ | 5B | 99 |
| Example 32 | ○ | 5B | 98.9 |
| Comparative Example 28 | X | 1B | 41 |

As described above, according to the invention, the pigment for exterior materials allows the cerium layer and the aluminum oxide layer to be easily coated onto the MgO.SiO$_2$ low refractive index layer, thereby securing improved properties in terms of moisture resistance and weather resistance as compared to existing pigments.

Although the present invention has been described with reference to some embodiments, it should be understood that various modifications, changes, alterations, and equivalent embodiments can be made by those skilled in the art without departing from the spirit and scope of the invention.

Particularly, although a multi-layer pigment for exterior materials including first and second metal oxide layers has been focused upon in the above embodiments, the present invention includes embodiments in which a cerium layer and an aluminum oxide layer are formed on a monolayer pigment including only a MgO.SiO$_2$ low refractive index layer to improve moisture resistance, weather resistance and the like.

Therefore, the scope of the invention should be limited only by the accompanying claims and equivalents thereof.

The invention claimed is:

1. A method for preparing a pigment for exterior materials comprising:
   (a) forming a pigment powder by coating an oxide layer including MgO·SiO$_2$ on surfaces of flakes used as a matrix;
   (b) forming a suspension having a solid content of 5% by weight (wt %) to 20 wt % by mixing the pigment powder with DI water, followed by stirring and dispersing the mixture;
   (c) dumping CeCl$_3$ to the suspension, followed by stirring for 5 minutes to 30 minutes;
   (d) heating the suspension of (c) to 60° C. to 90° C., followed by stirring for 10 minutes to 60 minutes;
   (e) refluxing the suspension of (d) for 5 minutes to 30 minutes after adjusting a pH thereof to 1 to 5;
   (f) mixing the suspension of (e) with an Al(NO$_3$)$_3$ solution to maintain a constant pH and refluxing the suspension for 10 minutes to 60 minutes after injection of the solution;
   (g) adjusting the pH of the suspension of (f) to 3 to 9 while stirring the suspension; and
   (h) injecting a silane coupling solution into the suspension having an increased pH in (g) to maintain the pH and refluxing the suspension for 10 minutes to 30 minutes after injection of the silane coupling solution.

2. The method according to claim 1, wherein the (a) forming pigment powder comprises:
   (a1) forming a suspension by mixing the flakes with DI water, followed by stirring and dispersing the mixture;
   (a2) coating a first metal oxide layer onto the surfaces of the flakes by hydrolyzing a first soluble inorganic metal salt solution after titrating the first soluble inorganic metal salt solution into the suspension of (a1);
   (a3) coating an oxide layer onto a surface of the first metal oxide layer by hydrolyzing a soluble-inorganic salt solution containing 5 wt % to 35 wt % of MgO·SiO$_2$ after titrating the soluble-inorganic salt solution into the suspension of (a2);
   (a4) coating a second metal oxide layer onto a surface of the oxide layer by hydrolyzing a second soluble inorganic metal salt solution after titrating the second soluble inorganic metal salt solution into the suspension of (a3); and
   (a5) separating pigment powder from the suspension of (a4).

3. The method according to claim 2, wherein the suspensions of (a2) to (a4) are maintained at 60° C. to 90° C.; the suspensions of (a2) or (a4) are adjusted to a pH of 1 to 9, and refluxed for 10 minute to 30 minute after completion of titration of the solution; and the suspension of (a3) is adjusted to a pH of 4 to 14, and refluxed for 30 minutes to 60 minutes after completion of titration of the solution.

4. The method according to claim 2, wherein the first and second soluble inorganic metal salt solutions comprise at least one selected from among SnCl$_4$, TiCl$_4$, TiOCl$_2$, TiOSO$_4$, FeCl$_3$, FeSO$_4$, SiCl$_4$, ZrOCl$_2$, Na$_2$O·SiO$_2$·5H$_2$O, MnCl$_2$, MgCl$_2$, AlCl$_3$, and CoCl$_2$, and the soluble-inorganic salt solution comprises at least one selected from among water glass, MgCl$_2$, silicate, AlCl$_3$, KCl$_3$, and boric acid.

5. The method according to claim 2, wherein the oxide layer is present in an amount of 5 wt % to 35 wt % based on a total weight of the pigment including the first and second metal oxide layers and the oxide layer, and further comprises at least one selected from among SiO$_2$, MgO·Al$_2$O$_3$, K$_2$·SiO$_2$, and Mg$_2$SiO$_4$.

6. A pigment for exterior materials comprising:
   a flake matrix comprising at least one of synthetic mica, natural mica, glass, plate-shaped iron oxide, plate-shaped alumina, and plate-shaped silica;
   a first metal oxide layer coated onto an upper side of the matrix;
   an oxide layer coated onto an upper side of the first metal oxide layer and comprising MgO·SiO$_2$;
   a second metal oxide layer coated onto an upper side of the oxide layer;
   a cerium layer formed on the second metal oxide layer; and
   an aluminum oxide layer formed on an upper side of the cerium layer.

7. A pigment for exterior materials comprising:
   a flake matrix comprising at least one of synthetic mica, natural mica, glass, plate-shaped iron oxide, plate-shaped alumina, and plate-shaped silica;
   an oxide layer coated onto an upper side of the matrix and comprising MgO·SiO$_2$;
   a cerium layer formed on an upper side of the oxide layer; and
   an aluminum oxide layer formed on an upper side of the cerium layer.

* * * * *